United States Patent
Zheng et al.

(10) Patent No.: US 8,331,480 B2
(45) Date of Patent: Dec. 11, 2012

(54) METHOD OF AND GENERATOR FOR GENERATING PREAMBLE SEQUENCES IN COMMUNICATION SYSTEMS

(75) Inventors: Yan-Xiu Zheng, Taipei County (TW); Chang-Lung Hsiao, Hsinchu (TW); Wen-Sheng Feng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 525 days.

(21) Appl. No.: 12/146,421

(22) Filed: Jun. 25, 2008

(65) Prior Publication Data
US 2009/0016464 A1    Jan. 15, 2009

Related U.S. Application Data

(60) Provisional application No. 60/949,842, filed on Jul. 13, 2007.

(51) Int. Cl.
H04L 27/00     (2006.01)
(52) U.S. Cl. ........ 375/295; 375/345; 375/131; 370/336; 370/338; 370/342
(58) Field of Classification Search ............. 375/295
See application file for complete search history.

(56) References Cited

U.S. PATENT DOCUMENTS

| | | | |
|---|---|---|---|
| 7,453,856 B2 * | 11/2008 | Guey | ........................... 370/336 |
| 2004/0066740 A1 | 4/2004 | Suh et al. | |
| 2004/0114504 A1 | 6/2004 | Jung et al. | |
| 2004/0136464 A1 | 7/2004 | Suh et al. | |
| 2004/0202103 A1 | 10/2004 | Suh et al. | |
| 2004/0252777 A1 | 12/2004 | Suh et al. | |

(Continued)

FOREIGN PATENT DOCUMENTS
WO    WO 2006/023536    3/2006

OTHER PUBLICATIONS
Chinese Office Action dated Jan. 31, 2012 for Chinese Application No. 200810133543.5.

*Primary Examiner* — Lihong Yu
(74) *Attorney, Agent, or Firm* — Alston & Bird LLP (57) ABSTRACT

A method forms a preamble sequence in a wireless communication system. The method comprises determining a value K related to a time-domain characteristic of the wireless communication system so that a time-domain preamble sequence includes a number of K waveforms similar in shape to one another having a linear phase shift, identifying a first preamble sequence for a first band, the first preamble sequence having a first length not dividable by K, identifying at least one second preamble sequence each for a second band, the at least one second preamble sequence having at least one second length, identifying the length of a third preamble sequence, the length of the third preamble sequence equal to a sum of the first length and the at least one second length, determining whether the time-domain characteristic is maintained when the one or more of the at least one second preamble sequence is concatenated with the first preamble sequence, modifying one or more of the at least one second preamble sequence if the time-domain characteristic is not maintained when concatenated, and forming the third preamble sequence by concatenating the first preamble sequence and the at least one second preamble sequence having one or more second preamble sequence modified.

33 Claims, 6 Drawing Sheets

U.S. PATENT DOCUMENTS

| | | |
|---|---|---|
| 2005/0035885 A1 | 2/2005 | Hosur et al. |
| 2005/0054313 A1 | 3/2005 | Gummadi et al. |
| 2005/0105460 A1 | 5/2005 | Suh et al. |
| 2005/0111522 A1 | 5/2005 | Sung et al. |
| 2005/0201334 A1 | 9/2005 | Roh et al. |
| 2005/0226142 A1 | 10/2005 | Moorti et al. |
| 2005/0232342 A1 | 10/2005 | Batra et al. |
| 2005/0243940 A1* | 11/2005 | Huh et al. ................. 375/260 |
| 2005/0249319 A1* | 11/2005 | Suh et al. ................. 375/347 |
| 2006/0039451 A1 | 2/2006 | Zhuang et al. |
| 2006/0062196 A1* | 3/2006 | Cai et al. ................. 370/345 |
| 2006/0098752 A1 | 5/2006 | Song et al. |
| 2006/0146869 A1 | 7/2006 | Zhang et al. |
| 2006/0274852 A1 | 12/2006 | Trachewsky et al. |
| 2007/0097908 A1 | 5/2007 | Khandekar et al. |
| 2007/0097909 A1 | 5/2007 | Khandekar et al. |
| 2007/0104088 A1 | 5/2007 | Mujtaba |
| 2007/0104089 A1 | 5/2007 | Mujtaba |

\* cited by examiner

METHOD OF AND GENERATOR FOR GENERATING PREAMBLE SEQUENCES IN COMMUNICATION SYSTEMS

CROSS-REFERENCE TO RELATED APPLICATIONS

This application claims the benefit of U.S. Provisional Application No. 60/949,842, filed Jul. 13, 2007 which is incorporated herein by reference.

BACKGROUND

The present invention relates to communication systems. More particularly, the present invention relates to methods of and generators for generating preamble sequences in the communication systems.

In a wireless communication system, a mobile device may access an infrastructure station such as a base station or a relay station by detecting a preamble sequence. In general, a preamble sequence in the time domain may include a periodic shape, which may exhibit a time-domain characteristic. Moreover, the time-domain characteristic may be maintained in a frequency-domain preamble sequence of a legacy system and a new system. A mobile device may link a communication system if a receiver of the mobile device detects a related preamble sequence of the communication system. In a multi-carrier communication system such as an orthogonal frequency division modulation (OFDM) system or an OFDM-based system, a length-64 preamble sequence may be repeated four times. That is, the time-domain preamble sequence may include "P" (in the present case, 4) periodic waveforms identical to one another. Furthermore, the number of samples of the time-domain preamble sequence is an integer multiple of the number of waveforms "P" and is evenly dividable by P. Likewise, the number of tones of the frequency-domain preamble sequence is also evenly dividable by P.

Moreover, in a wireless communication system, a new system may have a wider bandwidth than a legacy system and thus may require a longer preamble sequence than the legacy system. Given a conventional OFDM or OFDM-based system, a preamble sequence of the new system may be formed by a multiple fold of the preamble sequence of the legacy system. However, in some applications, the length of a legacy preamble sequence may not be an integer multiple of P. It may therefore be desirable to have a method of generating a preamble sequence capable of supporting both the legacy system and the new system.

SUMMARY

Examples of the present invention may provide a method of forming a preamble sequence in a wireless communication system, the method comprising determining a value K related to a time-domain characteristic of the wireless communication system so that a time-domain preamble sequence includes a number of K waveforms similar in shape to one another having a linear phase shift, identifying a first preamble sequence for a first band, the first preamble sequence having a first length not dividable by K and maintaining the time-domain characteristic, identifying at least one second preamble sequence each for a second band, the at least one second preamble sequence having at least one second length and maintaining the time-domain characteristic, identifying the length of a third preamble sequence, the length of the third preamble sequence equal to a sum of the first length and the at least one second length, determining whether the time-domain characteristic is maintained when the one or more of the at least one second preamble sequence is concatenated with the first preamble sequence, modifying one or more of the at least one second preamble sequence if the time-domain characteristic is not maintained when concatenated, and forming the third preamble sequence by concatenating the first preamble sequence and the at least one second preamble sequence having one or more second preamble sequence modified.

Some examples of the present invention may also provide a method of forming a preamble sequence in a wireless communication system, the method comprising determining a value K related to a time-domain characteristic of the wireless communication system so that a time-domain preamble sequence includes a number of K waveforms similar in shape to one another having a linear phase shift, identifying a first preamble sequence for a first band, the first preamble sequence having a first length not dividable by K and maintaining the time-domain characteristic, identifying at least one second preamble sequence each for a second band, the at least one second preamble sequence maintaining the time-domain characteristic, forming a third preamble sequence based on the first preamble sequence and the at least one second preamble sequence by concatenating the first preamble sequence and the at least one second preamble sequence if the time-domain characteristic is maintained after concatenation, and forming a fourth preamble sequence based on the first preamble sequence and the at least one second preamble sequence by modifying one or more of the at least one second preamble sequence if the time-domain characteristic is not maintained due to concatenation, and concatenating the first preamble sequence and the at least one second preamble sequence having one or more second preamble sequence modified.

Examples of the present invention may further provide a method of forming a preamble sequence in a wireless communication system, the method comprising determining a value K related to a time-domain characteristic of the wireless communication system so that a time-domain preamble sequence includes a number of K waveforms similar in shape to one another having a linear phase shift, identifying a first preamble sequence for a first band, the first preamble sequence having a first length dividable by K and maintaining the time-domain characteristic, identifying at least one second preamble sequence each for a second band and being a duplicate of the first preamble sequence, forming a third preamble sequence by concatenating the first preamble sequence and the at least one second preamble sequence, and forming a fourth preamble sequence by multiplying the at least one second preamble sequence by a linear phase, wherein a phase value of the linear phase is related to the position of a non-zero tone of the at least one second preamble sequence in the third preamble sequence.

Examples of the present invention may provide a generator for forming a preamble sequence in a wireless communication system, the generator comprising an identifying module configured to identify whether a time-domain characteristic is maintained if a first preamble sequence and at least one second preamble sequence are concatenated, wherein based on the time-domain characteristic, a time-domain preamble sequence includes a number of K waveforms similar in shape to one another having a linear phase shift, a modifying module configured to modify one or more of the at least one second preamble sequence if the time-domain characteristic is not maintained, and a concatenating module configured to concatenate the first preamble sequence and the at least one second preamble sequence having one or more second preamble sequence modified if the time-domain characteristic is not maintained and concatenate the first preamble sequence and the at least one second preamble sequence if the time-domain characteristic is maintained.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION

Reference will now be made in detail to the present examples of the invention, examples of which are illustrated in the accompanying drawings. Wherever possible, the same reference numbers will be used throughout the drawings to refer to the same or like parts.

Figure 1A:
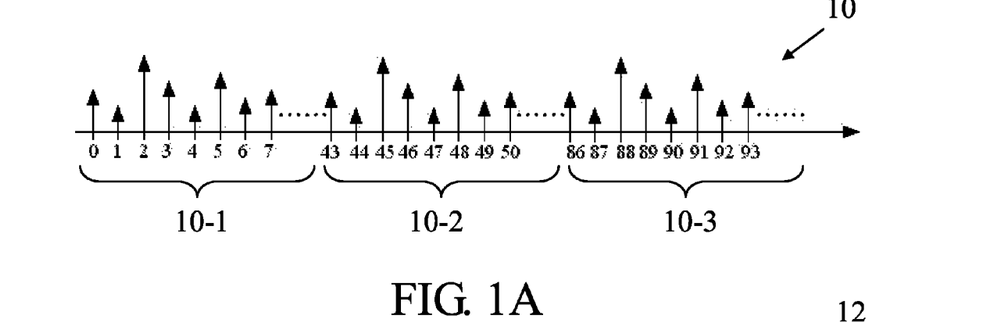
FIG. 1A is a diagram illustrating an exemplary preamble sequence in a time domain for a legacy system.
Figure 1B:
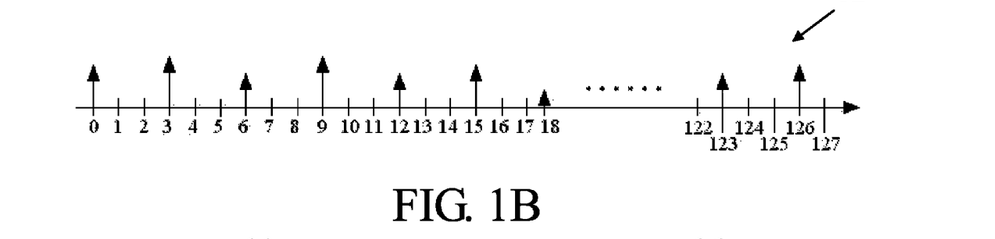
FIG. 1B is a diagram illustrating an exemplary preamble sequence in a frequency domain for the legacy system.

FIG. 1A is a diagram illustrating an exemplary preamble sequence 10 in a time domain for a legacy system. FIG. 1B is a diagram illustrating an exemplary preamble sequence 12 in frequency domain for the legacy system. In an orthogonal frequency division modulation (OFDM) system or an OFDM-based system, a preamble or preamble sequence may be used for frequency synchronization between a base station and a mobile station. Specifically, a preamble sequence indicating a start point of a frame may be transmitted for a predetermined period beginning at the start point of the frame.

Referring to FIG. 1A, the time-domain preamble sequence 10 may include a number of "K" successive waveforms, which may be similar to one another having a linear phase shift, wherein K is a positive integer. In the present example, the time-domain preamble sequence 10 may include a number of 128 samples distributed in three (K=3) waveforms 10-1, 10-2 and 10-3. Furthermore, referring to FIG. 1B, the frequency-domain preamble sequence 12 may include a number of 128 tones. According to the present invention, the number of samples or tones in a legacy or predefined preamble sequence may not be dividable by the value of "K." For example, in the present case, the length of the legacy preamble sequence, i.e., 128 (samples in the time domain or tones in the frequency domain), is not dividable by 3 (waveforms). The characteristic that the length of a legacy preamble sequence is not an integer multiple of the number of waveforms in the legacy preamble sequence may facilitate a flexible concatenation of preamble sequences of different lengths, as will be described in paragraphs below. For simplicity, the case with K=3 is used in the examples of the present invention throughout the specification. However, skilled persons in the art will understand that other values of K, for example, 5 and 7, may be used to suit other applications.

While receiving a time-domain preamble sequence, a receiver of a mobile device may use a correlation method to calculate the autocorrelation or the cross correlation of the received successive waveforms and check if the received sequence includes the preamble sequence. Referring to FIG. 1B, to maintain the time-domain characteristic (K=3), every K tones of the frequency-domain preamble sequence 12 may be set to a non-zero value while the other tones may be set to a null value (zero). In other words, two immediately adjacent significant tones with non-zero values may be separated from each other by (K−1) null tones. In the present example, because K is equal to 3 and the length of the frequency-domain preamble 12 is 128, non-zero values may be allocated to tones at the positions numbered 0, 3, 6, ... and 126, denoted as {0,3,6, ... ,126 }.

Moreover, with the rapid development in communication technologies, a new system or standard and a legacy system or standard may coexist in a wireless communication network. In this case, the new system may be backward compatible with the legacy system and provide bandwidth scalability. In one example according to the present invention, backward compatibility or bandwidth scalability may include that a new terminal or subscriber station using a new standard may operate in a conventional network without significant impact on the performance and operation of the terminal relative to the conventional network. In another example, a low-end terminal may camp on a partial band of a system which operates on a wider band. Furthermore, backward compatibility may include, for example, that a legacy terminal or subscriber station using a conventional standard may operate in a new network without significant impact on the performance and operation of the terminal relative to the new network. Throughout the specification, a "new" system or standard may refer to an "updated," "evolved" or "next-generation" system or standard, while a "legacy" system or standard may refer to an "old" or "current" system or standard. For example, a "new" standard may be a standard that is in use as of the date of the filing of this application, and a "legacy" standard may be a standard that is in use prior to the date of the filing of this application and may be still in use for some time after the filing of this application. In one example according to the present invention, the legacy standard may include but is not limited to the IEEE 802.16e standard, while the new standard may include but is not limited to the IEEE 802.16m standard.

Figure 2A:
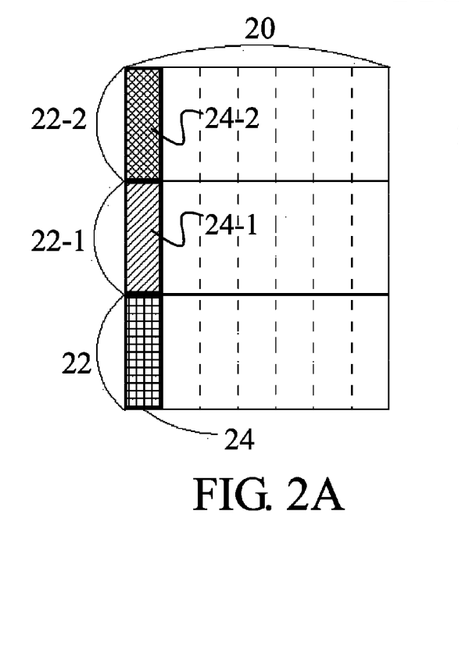
FIG. 2A is a diagram illustrating an exemplary frame structure of a new system.

FIG. 2A is a diagram illustrating an exemplary frame structure of a new system. Referring to FIG. 2A, the frame structure includes three contiguous bands 22, 22-1 and 22-2, wherein each of the bands 22, 22-1 and 22-2 may have a bandwidth able to support a preamble sequence having a length of "N" tones or "N" carriers, N being a positive integer. In one example, one of the bands 22, 22-1 and 22-2, for example, the band 22, may be allocated for transmission of OFDM symbols in a legacy standard, and a band composed of the bands 22, 22-1 and 22-2 may be used for transmission of OFDM symbols in a new standard. Accordingly, the bandwidth of the frame structure using the new standard, i.e., 3N, is three times the bandwidth of the frame structure using the legacy standard, i.e., N. Moreover, the length of a legacy preamble sequence 24 for the legacy band 22 is N, while the length of a new preamble sequence, including preamble sequences 24, 24-1 and 24-2, is 3N. That is, the legacy preamble sequence is one third the new preamble sequence in length. The bandwidth of each of the bands 22, 22-1 and 22-2 in the present example may occupy one-third of a predetermined bandwidth. In other examples, however, the bands 22, 22-1 and 22-2 may be different from one another in bandwidth. Furthermore, the number of bands in a frame may not be limited to three as in the present example. Skilled persons in the art will understand that four or more than four bands may also be possible to suit different applications.

Figure 2B:
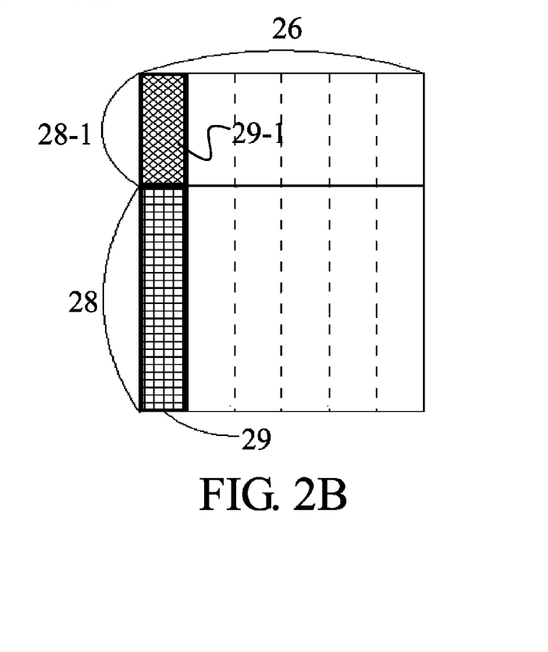
FIG. 2B is a diagram illustrating another exemplary frame structure of a new system.

FIG. 2B is a diagram illustrating another exemplary frame structure of a new system. Referring to FIG. 2B, the frame structure includes two contiguous bands 28 and 28-1 for communication in a legacy standard and a new standard, respectively. The bandwidths of the new system and the legacy system are $$\frac{3}{2}N$$

and N, respectively. Moreover, the length of a legacy preamble sequence 29 for the legacy band 28 is N, while the length of a new preamble sequence, including the preamble sequences 29 and $$29\text{-}1, \text{ is } \frac{3}{2}N.$$

For a legacy system and a new system to coexist in one frame structure, according to an example of the present invention, a new preamble sequence may be formed by concatenating a legacy preamble sequence with a predefined preamble sequence. In one example, a predefined sequence may be concatenated in front of a legacy preamble sequence. In another example, a predefined sequence may be concatenated at the rear of a legacy preamble sequence. In still another example, a legacy preamble sequence may be concatenated with a modified predefined preamble sequence and/or one or more duplicate of the predefined preamble sequence, depending on the bandwidth of a channel allocated for the new system. In general, the larger the bandwidth, the longer the new preamble sequence and thus the more predefined sequence to be concatenated.

Referring again to FIG. 2A and FIG. 2B, in the example illustrated in FIG. 2A, the new preamble sequence for the new system may be formed by concatenating two predefined preamble sequences 24-1 and 24-2 in front of or in the back of the legacy preamble sequence 24. The predefined preamble sequence to be concatenated may thus be longer than the legacy preamble sequence. In this case, the predefined preamble sequence is two times the legacy preamble sequence in length. Furthermore, in the example illustrated in FIG. 2B, the new preamble sequence for the new system may be formed by concatenating a predefined preamble sequence 29-1 in front of or in the back of the legacy preamble sequence 29. The predefined preamble sequence to be concatenated may thus be shorter than the legacy preamble sequence. In this case, the predefined preamble sequence is half the legacy preamble sequence in length.

Figure 3A:
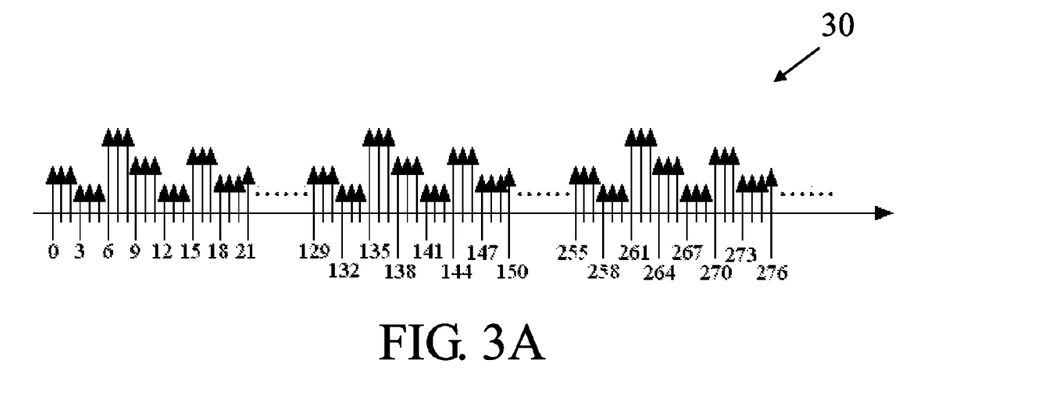
FIG. 3A is a diagram illustrating a preamble sequence in a time domain for a new system according to an example of the present invention.
Figure 3B:
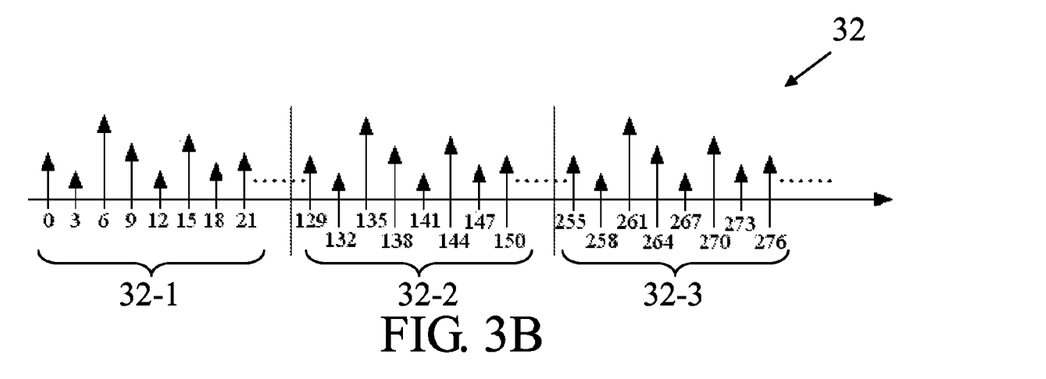
FIG. 3B is a diagram illustrating a preamble sequence in a frequency domain for the new system.

FIG. 3A is a diagram illustrating a preamble sequence 30 in a time domain for a new system according to an example of the present invention, and FIG. 3B is a diagram illustrating a preamble sequence 32 in a frequency domain for the new system. Referring to FIG. 3A, the time-domain preamble sequence 30 may include three (K=3) successive waveforms similar to one another or having a linear phase shift. In one example, the length of the time-domain preamble sequence 30 is 384.

Referring to FIG. 3B, the frequency-domain preamble sequence 32 may include a number of 384 tones for communication in a first band 32-1, a second band 32-2 and a third band 32-3. Moreover, the first band 32-1 may be allocated for communication in a legacy standard, and the second and third bands 32-2 and 32-3 may be allocated for communication in a new standard. Note that the length of a legacy preamble sequence for the first band 32-1, which may be similar to the legacy preamble sequence 32 illustrated in FIG. 1B, is 128, and is not dividable by K=3.

Examples of forming a new preamble sequence based on a legacy preamble sequence and at least one predefined preamble sequence are given below. In the following examples, K=3 may be predetermined and the length of a legacy preamble sequence is not dividable by K. It may be assumed that $S_1=\{1,0,0,2,0,0,3,0,0,4,0\}$ is a legacy preamble sequence in frequency domain and $S_2=\{0,0,3,0,0,5,0,0,2,0,0\}$ and $S_3=\{0,3,0,0,5,0,0,2,0,0,4\}$ are predefined preamble sequences frequency domain. The legacy preamble sequence $S_1$ has a length of 11, which is not dividable by K. Furthermore, the frequency-domain sequences $S_1$, $S_2$ and $S_3$ maintain the time-domain characteristic, i.e., two adjacent non-zero tones are separated from each other by two zero tones.

To form a length-22 new preamble sequence, a preamble sequence to be concatenated with the legacy preamble sequence may need to be modified in order to maintain the time-domain characteristic K=3. The preamble sequence to be concatenated may include one of $S_1$, $S_2$ and $S_3$ If not modified, the time-domain characteristic may be lost. For example, if $S_1$ is concatenated directly after the legacy preamble sequence $S_1$, a new preamble sequence $\{1,0,0,2,0,0,3, 0,0,4,0,1,0,0,2,0,0,3,0,0,4,0\}$ may be formed, wherein the $10^{th}$ tone and the $12^{th}$ tone are separated from each other by only one zero tone rather than the required two (=K−1) zero tones, resulting in time-domain inconsistency. Likewise, if $S_2$ is concatenated directly after the legacy preamble sequence $S_1$, a new preamble sequence $\{1,0,0,2,0,0,3,0,0,4,0,0,0,3,0, 0,5,0,0,2,0,0\}$ may be formed, wherein the $10^{th}$ tone and the $14^{th}$ tone are separated from each other by three (=K) zero tones rather than the required two zero tones, also resulting in time-domain inconsistency. However, the time-domain characteristic may be maintained if $S_3$ is concatenated directly after the legacy preamble sequence $S_1$, resulting in a new preamble sequence {1,0,0,2,0,0,3,0,0,4,0,0,3,0,0,5,0,0,2,0,0,4}.

In the case of concatenating a second $S_1$ after a first $S_1$, i.e., the legacy preamble sequence, the second $S_1$ may need to be modified. In one example, the second $S_1$ may be cyclic-right shifted by one position, resulting in a modified $S_1$'={0,1,0,0, 2,0,0,3,0,0,4}. As a result, a length-22 new preamble sequence formed by $S_1$ concatenated with $S_1$' is {1,0,0,2,0,0, 3,0,0,4,0,0,1,0,0,2,0,0,3,0,0,4}, which maintains the time-domain characteristic.

In another example, the second $S_1$ may be cyclic-left shifted by two positions, resulting in a modified $S_1$"={0,2,0, 0,3,0,0,4,0,1,0}. However, the modified $S_1$" does not keep the time-domain characteristic and needs to be further modified. For example, the last two tones "1" and "0" of the modified $S_1$" may be interchanged, resulting in $S_1$'"={0,2,0,0,3,0,0,4, 0,0,1}. As a result, a length-22 new preamble sequence formed by $S_1$ concatenated with $S_1$'" is {1,0,0,2,0,0,3,0,0,4, 0,0, 2,0,0,3,0,0,4,0,0,1}, which maintains the time-domain characteristic. As an alternative, the $10^{th}$ tone "1" of the modified $S_1$" may be replaced by "0", resulting in another modified preamble sequence={0,2,0,0,3,0,0,4,0,0,0}. Accordingly, a length-22 new preamble sequence is {1,0,0,2,0,0,3,0,0,4,0,0, 2,0,0,3,0,0,4,0,0,0}.

Alternatively, a preamble sequence may be concatenated before a legacy preamble sequence. For example, $S_3$ may be cyclic-right shifted by one position, resulting in $S_3$'={4,0,3, 0,0,5,0,0,2,0,0}, which may be further modified by replacing the first tone 4 with 0, resulting in $S_3$"={0,0,3,0,0,5,0,0,2,0, 0}. As a result, a length-22 new preamble sequence formed by $S_3$" concatenated with $S_1$ is {0,0,3,0,0,5,0,0,2,0,0,1,0,0,2,0, 0,3,0,0,4,0}. Furthermore, $S_2$ may be concatenated before $S_1$, resulting in a length-22 new preamble sequence {0,0,3,0,0,5, 0,0,2,0,0,1,0,0,2,0,0,3,0,0,4,0}.

In still another example, to construct a length-33 new preamble sequence, $S_3$ and $S_2$ may be concatenated after $S_1$ in order, which results in the preamble sequence {1,0,0,2,0,0,3, 0,0,4,0,0,3,0,0,5,0,0,2,0,0,4,0,0,3,0,0,5,0,0,2,0,0}. Moreover, a length-33 new preamble sequence may be formed by concatenating $S_2$ before $S_1$ and concatenating $S_3$ after $S_1$, which results in {0,0,3,0,0,5,0,0,2,0,0,1,0,0,2,0,0,3,0,0,4,0, 0,3,0,0,5,0,0,2,0,0,4}.

In the above-mentioned examples, the predefined preamble sequences $S_2$ and $S_3$ are equal to the legacy preamble sequence $S_1$ in length, which may be related to the example described and illustrated with respect to FIG. 2A. In other examples, a predefined preamble sequence may be longer or shorter in length than a legacy preamble sequence. For example, in the example illustrated in FIG. 2B, it may be assumed that a legacy preamble sequence $S_4$={1,0,0,2,0,0,3, 0,0,4,0,0,3,0,0,5,0,0,2,0,0,4}. Given the same $S_2$ and $S_3$, to form a length-33 new preamble sequence, $S_2$ may be concatenated after $S_4$, which results in {1,0,0,2,0,0,3,0,0,4,0,0,3,0, 0,5,0,0,2,0,0,4,0,0,3,0,0,5,0,0,2,0,0}. Furthermore, $S_3$ may be modified by replacing the last tone with a zero tone and then cyclic-right shifting the modified $S_3$ by one position, resulting in $S_3$'={0,0,3,0,0,5,0,0,2,0,0}. A length-33 new preamble sequence formed by $S_1$ concatenated with $S_3$' is {1,0, 0,2,0,0,3,0,0,4,0,0,3,0,0,5,0,0,2,0,0,4,0,0,3,0,0,5,0,0,2,0,0}.

Figure 4A:
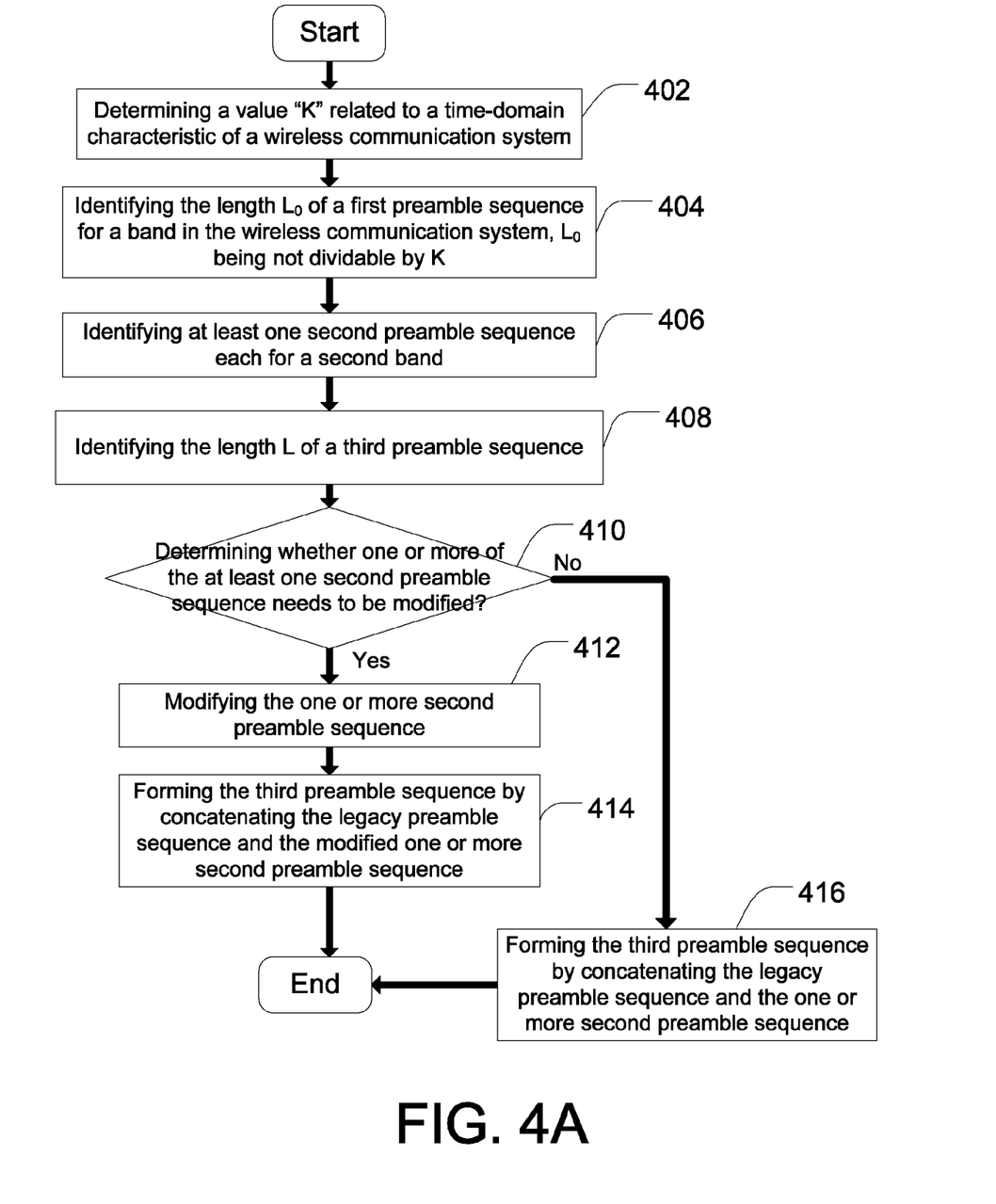
FIG. 4A is a flow diagram illustrating a method of forming a preamble sequence according to an example of the present invention.

FIG. 4A is a flow diagram illustrating a method of forming a preamble sequence according to an example of the present invention. Referring to FIG. 4, a value "K" related to a time-domain characteristic of preamble sequences in a wireless communication system may be determined at step 402, K being a positive integer. At step 404, the length $L_0$ of a first preamble sequence, for example, a legacy preamble sequence, may be identified. The length $L_0$ of the first preamble sequence may not be dividable by K.

At step 406, at least one second preamble sequence, for example, a predefined preamble sequence, may be identified. Furthermore, the at least one second preamble sequence may have a length of $L_1, L_2, \ldots L_N$, depending on the number of bands available in the wireless communication system.

At step 408, the length L of a third preamble sequence may be identified. The length L may be equal to $L_0$ plus a sum of the length of the at least one second preamble sequence because the new preamble sequence for the wireless communication system may be formed by the first preamble sequence and the at least one second preamble sequence. In one example, one or more of the at least one second preamble sequence may include a duplicate of the first preamble sequence.

Next, at step 410, it may be determined whether one or more of the at least one second preamble sequence needs to be modified so as to maintain the time-domain characteristic. In accordance with the time-domain characteristic, two adjacent non-zero tones or carriers in the first, second and third preamble sequences may be separated from each other by (K−1) tones or carriers. If confirmative, the one or more second preamble sequence may be modified by, for example, a cyclic shift to the right or a cyclic shift to the left by at least one position followed, if necessary, by a replacement of a non-zero tone with a zero tone. The third preamble sequence may then be formed at step 414 by concatenating the legacy preamble sequence and the at least one second preamble sequence having one or more second preamble sequence modified. In one example, the concatenation may include placing one or more modified second preamble sequence after the first preamble sequence. In another example, the concatenation may include placing one or more modified second preamble sequence before the first preamble sequence. In still another example, the concatenation may include placing one or more modified second preamble sequence before the first preamble sequence and one or more modified second preamble sequence after the first preamble sequence.

If at step 410 it is determined that no modification is required, the third preamble sequence may be formed at step 416 by concatenating the first preamble sequence and the at least one second preamble sequence. Similar to step 414, the concatenation may include placing the at least one second preamble sequence before, after or partly before and partly after the first preamble sequence.

Figure 4B:
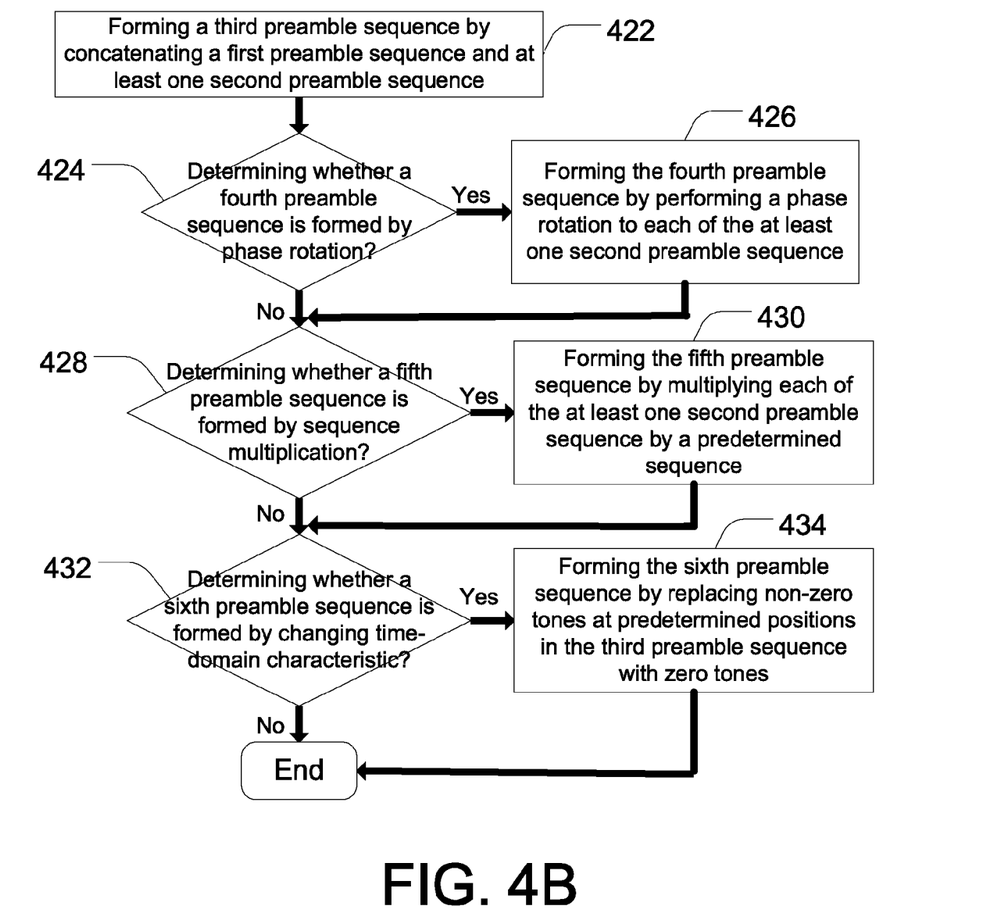
FIG. 4B is a flow diagram illustrating a method of forming a preamble sequence according to another example of the present invention.

To facilitate antenna identification or communication in a relatively high speed environment, one or more preamble sequence may be formed based on the preamble sequence formed at step 414 or 416. FIG. 4B is a flow diagram illustrating a method of forming a preamble sequence in accordance with another example of the present invention. Referring to FIG. 4B, at step 422, a third preamble sequence may be formed by concatenating a first preamble sequence and at least one second preamble sequence, wherein one or more of the at least one second preamble sequence may be modified before concatenation. The third preamble sequence may be formed by the method described and illustrated with reference to FIG. 4A.

At step 424, it may be determined whether a fourth preamble sequence may be formed by phase rotation. If confirmative, at step 426, the fourth preamble sequence may be formed by performing a phase rotation to each of the at least one second preamble sequence. In one example, an i-th one of the at least one second preamble sequence may be multiplied by a constant phase $e^{j\Phi i}$, for example, $\phi_1=\pi/3$ and $\phi_2=2\pi/3$.

Taking the above-mentioned $S_1$, $S_2$ and $S_3$ as an example, a length-33 third preamble sequence {1,0,0,2,0,0,3,0,0,4,0,0,3, 0,0,5,0,0,2,0,0,4,0,0,3,0,0,5,0,0,2,0,0} may be formed by concatenating $S_1$, $S_3$ and $S_2$ in order. A length-33 fourth preamble sequence may be formed by multiplying the second preamble sequences $S_2$ and $S_3$ by a first constant phase $$e^{\frac{j\pi}{3}}$$

and a second constant phase $$e^{\frac{j2\pi}{3}},$$

respectively. Accordingly, the fourth preamble sequence formed by $S_1$ and the constant phase-rotated $S_3$ and $S_2$ is $$\{1,0,0,2,0,0,3,0,0,4,0,0,3e^{\frac{j\pi}{3}},$$
$$0,0,5e^{\frac{j\pi}{3}},0,0,2e^{\frac{j\pi}{3}},0,0,4e^{\frac{j\pi}{3}},0,0,3e^{\frac{j2\pi}{3}},0,0,5e^{\frac{j2\pi}{3}},0,0,2e^{\frac{j2\pi}{3}},0,0\}.$$

In another example, an i-th one of the at least one second preamble sequence may be multiplied by a linear phase shift $e^{j\phi}$, for example, $\phi=2\pi[ik/N]$, i=0 to N−1, k being an ordinal number related to the position of a non-zero tone in the i-th one second preamble sequence and N being the length of the i-th one second preamble sequence. Taking the above-mentioned $S_1$, $S_2$ and $S_3$ as an example, a length-33 third preamble sequence {1,0,0,2,0,0,3,0,0,4,0,0,3,0,0,5,0,0,2,0,0,4,0,0,3,0, 0,5,0,0,2,0,0} may be formed by concatenating three length-11 $S_1$, $S_3$ and $S_2$ in order. A length-33 fourth preamble sequence may be formed by multiplying the second preamble sequences $S_2$ and $S_3$ by a first constant phase $$e^{\frac{j2\pi i}{11}}$$

and a second constant phase $$e^{\frac{j4\pi i}{11}},$$

respectively. Accordingly, the fourth preamble sequence formed by $S_1$ and the constant phase-rotated $S_3$ and $S_2$ is $$\{1,0,0,2,0,0,3,0,0,4,0,0,3e^{\frac{j2\pi}{11}},$$
$$0,0,5e^{\frac{j8\pi}{11}},0,0,2e^{\frac{j14\pi}{11}},0,0,4e^{\frac{j20\pi}{11}},0,0,3e^{\frac{j8\pi}{11}},0,0,5e^{\frac{j20\pi}{11}},0,0,2e^{\frac{j10\pi}{11}},0,0\}.$$

Alternatively, it may be determined at step 428 that a fifth preamble sequence may be formed by sequence multiplication. At step 430, each of the at least one second preamble sequence may be multiplied by a predetermined sequence. For example, $S_2$ and $S_3$ may be multiplied by a first sequence $A=\{a_1,a_2,a_2,a_3,a_4,a_5,a_6,a_7,a_8,a_9,a_{10},a_{11}\}$ and a second sequence $B=\{b_1,b_2,b_3,b_4,b_5,b_6,b_7,b_8,b_9,b_{10},b_{11}\}$, respectively. Accordingly, the fifth preamble sequence formed by $S_1$ and the multiplied $S_3$ and $S_2$ is {1,0,0,2,0,0,3,0,0,4,0,0,3$a_1$,0, 0,5$a_4$,0,0,2$a_7$,0,0,4$a_{10}$,0,0,3$b_3$,0,0,5$b_6$,0,0,2$b_9$,0,0}.

It will be appreciated by those skilled in the art that other predetermined sequences may be suitable for forming the second new preamble sequence. In one example, the predetermined sequence may include one of Wash codes, a generalized chirp-like (GCL) sequence, a pseudo random sequence and Reed-Muller codes. Moreover, if the length of a predetermined sequence is longer than the length of a second preamble sequence to be concatenated, the length of the predetermined sequence may be reduced to fit the second preamble sequence. Taking the Wash codes {1,−1,1,−1,1,−1,1,−1} as an example, if the required length of a second preamble sequence is 5, the first three values of the Wash codes may be removed, resulting in a modified sequence {−1,1,−1,1,−1}. In another example, the last three values may be removed, resulting in another modified sequence {1,−1,1,−1,1}. In other examples, the length of a predetermined sequence may be increased to fit the second preamble sequence.

Alternatively, it may be determined at step 432 that a sixth preamble sequence may be formed by changing the time-domain characteristic, which may facilitate communications in a relatively high speed environment. At step 434, the sixth preamble sequence may be formed by replacing non-zero tones at predetermined positions with zero tones in the third preamble sequence. In one example, every R tones of the non-zero tones in the third preamble sequence may be maintained while the others may be replaced with zero tones. For example, if R=2, every other non-zero tones may be replaced with zero tones. Given the third preamble sequence={1,0,0, 2,0,0,3,0,0,4,0, 0,3,0,0,5,0,0,2,0,0,4,0,0,3,0,0,5,0,0,2,0,0}, the sixth preamble sequence is {1,0,0,0,0,0,3,0,0,0,0,0,3,0,0, 0,0,0,2,0,0,0,0,0,3,0,0,0,0,0,2,0,0}. In the sixth preamble sequence, two adjacent non-zero tones are separated from each other by KR−1 (=5) tones, resulting in another time-domain characteristic K'=K×R=6.

In the above examples, a preamble sequence may be formed by concatenating a first preamble sequence and at least one second preamble sequence, wherein the length of the first preamble sequence is not dividable by K. In other examples, however, a seventh preamble sequence may be formed by a first preamble sequence and one or more of its duplicate, wherein the length of the first preamble sequence may be dividable by K. In this case, the peak-to-average power ratio (PAPR) issue may occur. For example, assuming that K=3 and a first preamble sequence $S_5=\{1,0,0,2,0,0,3,0, 0\}$, a length-27 preamble sequence may be formed by the first preamble sequence $S_5$ and two duplicates of $S_5$ as second preamble sequences, resulting in {1,0,0,2,0,0,3,0,0,1,0,0,2,0, 0,3,0,0,1,0,0,2,0,0,3,0,0}. The time-domain waveform of the seventh preamble sequence may include many zeros, which may cause the PAPR issue.

Figure 5:
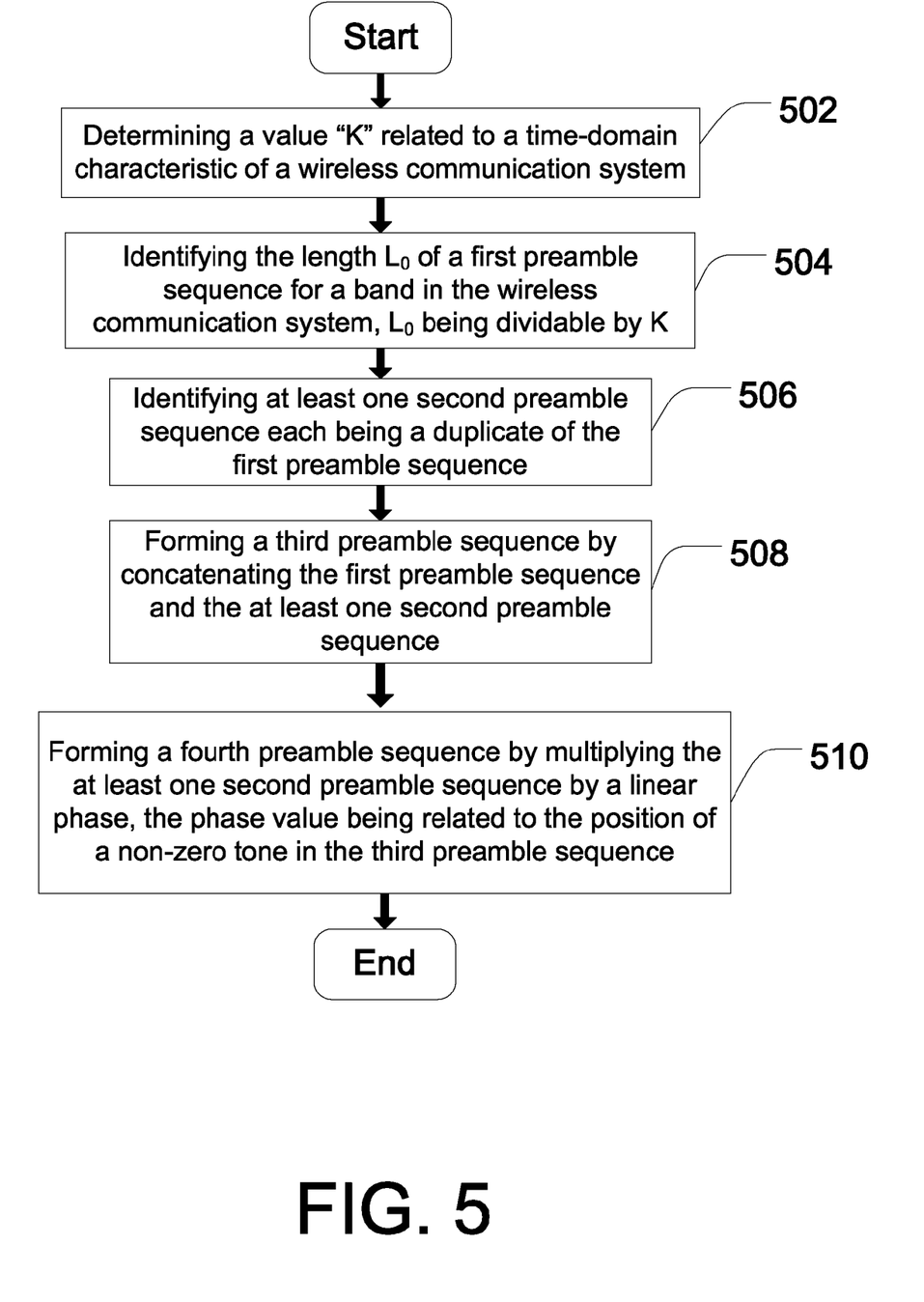
FIG. 5 is a flow diagram illustrating a method of forming a preamble sequence according to still another example of the present invention.

FIG. 5 is a flow diagram illustrating a method of forming a preamble sequence according to still another example of the present invention. Referring to FIG. 5, at step 502, a value "K" related to a time-domain characteristic of preamble sequences in a wireless communication system may be determined. At step 504, the length $L_0$ of a first preamble sequence may be identified. The length $L_0$ of the first preamble sequence may be dividable by K.

At step 506, at least one second preamble sequence each being a duplicate of the first preamble sequence may be identified. At step 508, a third preamble sequence may be formed by concatenating the first preamble sequence and the at least one second preamble sequence. To avoid the PAPR issue, at step 510, a fourth preamble sequence may be formed by multiplying the at least one second sequence by a linear phase, wherein a phase value of the linear phase may be related to the position of a non-zero tone in the third preamble sequence. In one example, a linear phase $$e^{\frac{j2\pi r}{N}}$$

may serve as a multiplier, where N is the length of the third preamble sequence and r is the ordinal number of a non-zero tone of the at least one second preamble sequence in the third preamble sequence. For example, given the first preamble sequence $S_5$ and the third preamble sequence {1,0,0,2,0,0,3, 0,0,1,0,0,2,0,0,3,0,0,1,0,0,2,0,0,3,0,0}, a fourth preamble sequence may be $$\{1,0,0,2,0,0,3,0,0,\ e^{\frac{j2\pi 9}{27}},$$
$$0,0,2e^{\frac{j2\pi 12}{27}},0,0,3e^{\frac{j2\pi 15}{27}},0,0,e^{\frac{j2\pi 18}{27}},0,0,2e^{\frac{j2\pi 24}{27}},0,0,3e^{\frac{j2\pi 30}{27}},0,0\}.$$

Figure 6:
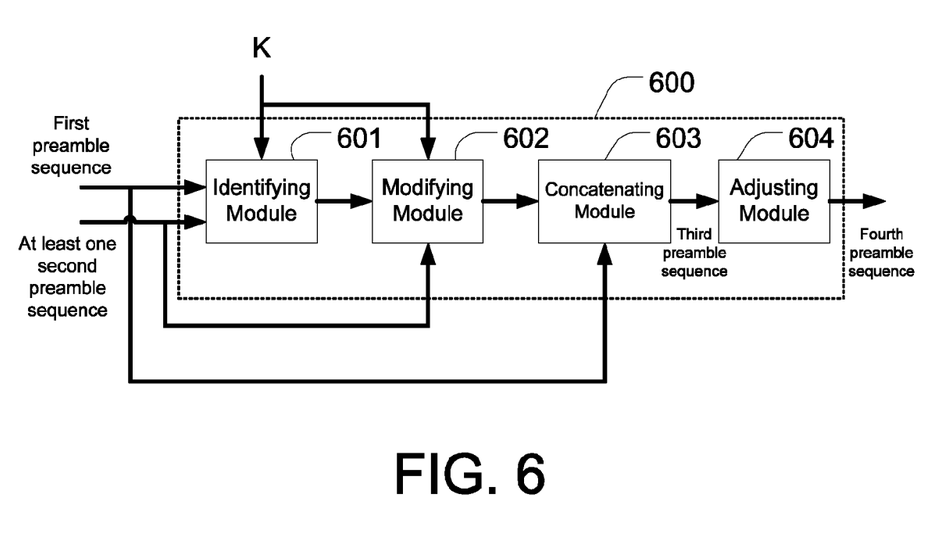
FIG. 6. is a block diagram of an exemplary generator for generating a preamble sequence.

FIG. 6. is a block diagram of an exemplary generator 600 for generating a preamble sequence. Referring to FIG. 6, the generator 600 may include an identifying module 601, a modifying module 602 and a concatenating module 603. The identifying module 601 may be configured to identify whether a time-domain characteristic K may be maintained if a first preamble sequence and at least one second preamble sequence are concatenated. The first preamble sequence may have a length not dividable by K. If the time-domain characteristic is not maintained, the modifying module 602 may modify one or more of the at least one second preamble sequence by, for example, cyclic shift and/or tone value replacement or exchange. The concatenating module 603 may concatenate the first preamble sequence and the at least one second preamble sequence having one or more second preamble sequence modified, resulting in a third preamble sequence. The modifying module 602 may simply send the at least one second preamble sequence to the concatenating module 603 if the identifying module 601 identifies that the time-domain characteristic K is maintained. The concatenating module 603 may be configured to concatenate the at least one second preamble sequence from the modifying module 602 before, after or partly before and partly after the first preamble sequence.

The generator 600 may further include an adjusting module 604. In one example, where the length of the first preamble sequence is not dividable by K, the adjusting module 604 may be configured to adjust the third preamble sequence from the concatenating module 603 by phase rotation, sequence multiplication or time-domain change, as the example described and illustrated with reference to FIG. 4B. In another example, where the length of the first preamble sequence is dividable by K and each of the at least one second preamble sequence is a duplicate of the first preamble sequence, the adjusting module 604 may be configured to adjust the third preamble sequence from the concatenating module 603 by linear phase multiplication, as the example described and illustrated with reference to FIG. 5.

The identifying module 601, modifying module 602, concatenating module 603 and adjusting module 604 may be implemented in hardware or software, in which the former may be more advantageous in view of operation speed while the latter may be more cost effective in view of design complexity. For example, if implemented in hardware, the above-mentioned modules 601 to 604 may be integrated in a processor chip of an access station such as a base station or a relay station. Alternatively, if implemented in software, the above-mentioned modules 601 to 604 may include executable programs or applications installed in the processor of the access station.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method of forming a preamble sequence in a wireless communication system, the method comprising:

determining a value K>1 related to a time-domain characteristic of the wireless communication system, the time-domain characteristic being that a time-domain preamble sequence includes a number of K waveforms similar in shape to one another having a linear phase shift;

identifying a first preamble sequence for a first frequency band, the first preamble sequence in a frequency domain having a plurality of tones defining a first length that is not an integer multiple of K, the first preamble sequence maintaining the time-domain characteristic;

identifying at least one second preamble sequence each for a second, different frequency band, the at least one second preamble sequence in the frequency domain having at least one plurality of tones defining at least one second length, the at least one second preamble sequence maintaining the time-domain characteristic as maintained by the first preamble sequence;

identifying the length of a third preamble sequence, the length of the third preamble sequence equal to a sum of the first length and the at least one second length; and forming the third preamble sequence by concatenating the first preamble sequence and the at least one second preamble sequence in the frequency domain, the third preamble sequence maintaining the time-domain characteristic as maintained by the first and at least one second preamble sequences.

2. The method of claim 1, wherein one or more of the at least one second preamble sequence includes a duplicate of the first preamble sequence.

3. The method of claim 1, wherein for each of the first preamble sequence and the at least one second preamble sequence to maintain the time-domain characteristic, every two adjacent non-zero tones are separated from each other by (K−1) zero tones.

4. The method of claim 1 further comprising:
  determining whether or not the time-domain characteristic is maintained when one or more of the at least one second preamble sequence is concatenated with the first preamble sequence; and
  modifying one or more of the at least one second preamble sequence in an instance in which, based on the determination, the time-domain characteristic is not maintained when concatenated,
  wherein concatenating the first preamble sequence and the at least one second preamble sequence includes concatenating the first preamble sequence and the at least one second preamble sequence having one or more second preamble sequence modified.

5. The method of claim 4, wherein modifying one or more of the at least one second preamble sequence includes cyclic-shifting the one or more of the at least one second preamble sequence in tone position.

6. The method of claim 5, wherein cyclic-shifting the one or more of the at least one second preamble sequence includes cyclic-shifting the one or more of the at least one second preamble sequence to the right in tone position, or cyclic-shifting the one or more of the at least one second preamble sequence to the left in tone position.

7. The method of claim 4, wherein forming the third preamble sequence includes concatenating the at least one second preamble sequence having one or more second preamble sequence modified after the first preamble sequence, or concatenating the at least one second preamble sequence having one or more second preamble sequence modified before the first preamble sequence.

8. The method of claim 4, wherein forming the third preamble sequence includes concatenating one or more of the at least one second preamble sequence having one or more second preamble sequence modified after the first preamble sequence while concatenating the remaining of the at least one second preamble sequence having one or more second preamble sequence modified before the first preamble sequence.

9. The method of claim 1 further comprising:
  forming a fourth preamble sequence by performing a phase rotation to each of at least one second preamble sequence concatenated with the first preamble sequence in the third preamble sequence.

10. The method of claim 9, wherein performing the phase rotation includes multiplying an i-th one of the at least one second preamble sequence concatenated with the first preamble sequence by a constant phase $e^{j\phi}$, where $\phi$ is constant for each of the at least one second preamble sequence.

11. The method of claim 9, wherein performing the phase rotation includes multiplying an i-th one of the at least one second preamble sequence concatenated with the first preamble sequence by a linear phase $e^{j\phi}$, $\phi=2\pi[ik/N]$, $i=0$ to $N-1$, k being an ordinal number related to the position of a non-zero tone in the one of the at least one second preamble sequence, and N being the length of the one of the at least one second preamble sequence.

12. The method of claim 1 further comprising:
  forming a fifth preamble sequence by multiplying at least one second preamble sequence concatenated with the first preamble sequence in the third preamble sequence by a predetermined sequence.

13. The method of claim 12, wherein the predetermined sequence includes Wash codes, a generalized chirp-like (GCL) sequence, a pseudo random sequence or Reed-Muller codes.

14. The method of claim 1 further comprising:
  forming a sixth preamble sequence by replacing non-zero tones at predetermined positions in the third preamble sequence with zero tones.

15. The method of claim 14, wherein every R non-zero tones are replaced with zero tones, which results in another time-domain characteristic K'=K×R, K' and R being positive integers.

16. The method of claim 1, wherein the first preamble sequence is one for communication in a legacy standard, and the third preamble sequence is one for communication in a new standard backward compatible with the legacy standard.

17. The method of claim 16, wherein a terminal camps on a portion of bands available for the wireless communication system.

18. A method of forming a preamble sequence in a wireless communication system, the method comprising:
  determining a value K>1 related to a time-domain characteristic of the wireless communication system, the time-domain characteristic being that a time-domain preamble sequence includes a number of K waveforms similar in shape to one another having a linear phase shift;
  identifying a first preamble sequence for a first frequency band, the first preamble sequence in a frequency domain having a plurality of tones defining a first length that is not an integer multiple of K, the first preamble sequence maintaining the time-domain characteristic;
  identifying at least one second preamble sequence each for a second, different frequency band, the at least one second preamble sequence in the frequency domain having at least one plurality of tones, the at least one second preamble sequence maintaining the time-domain characteristic as maintained by the first preamble sequence; and
  forming a fourth preamble sequence based on the first preamble sequence and the at least one second preamble sequence by modifying one or more of the at least one second preamble sequence in an instance in which the time-domain characteristic is not maintained due to concatenation, and in the frequency domain, concatenating the first preamble sequence and the at least one second preamble sequence having one or more second preamble sequence modified, the fourth preamble sequence maintaining the time-domain characteristic as maintained by the first and at least one second preamble sequences.

19. The method of claim 18, wherein one or more of the at least one second preamble sequence includes a duplicate of the first preamble sequence.

20. The method of claim 18, wherein modifying one or more of the at least one second preamble sequence includes cyclic-shifting the one or more of the at least one second preamble sequence in tone position.

21. The method of claim 18, wherein cyclic-shifting the one or more of the at least one second preamble sequence includes cyclic-shifting the one or more of the at least one second preamble sequence to the right in tone position, or cyclic-shifting the one or more of the at least one second preamble sequence to the left in tone position.

22. The method of claim 18 further comprising:
  forming a third preamble sequence based on the first preamble sequence and the at least one second preamble sequence by concatenating the first preamble sequence and the at least one second preamble sequence in an instance in which the time-domain characteristic is maintained after concatenation.

23. The method of claim 22 further comprising:
forming a fifth preamble sequence by performing a phase rotation to each of at least one second preamble sequence concatenated with the first preamble sequence in the third or fourth preamble sequences.

24. The method of claim 23, wherein performing the phase rotation includes multiplying an i-th one of the at least one second preamble sequence concatenated with the first preamble sequence by a constant phase $e^{j\phi}$, where $\phi$ is constant for each of the at least one second preamble sequence.

25. The method of claim 23, wherein performing the phase rotation includes multiplying an i-th one of the at least one second preamble sequence concatenated with the first preamble sequence by a linear phase $e^{j\phi}$, $\phi=2\pi[ik/N]$, i=0 to N−1, k being an ordinal number related to the position of a non-zero tone in the one of the at least one second preamble sequence, and N being the length of the one of the at least one second preamble sequence.

26. The method of claim 22 further comprising:
forming a sixth preamble sequence by multiplying at least one second preamble sequence concatenated with the first preamble sequence in the third or fourth preamble sequences by a predetermined sequence.

27. The method of claim 26, wherein the predetermined sequence includes Wash codes, a generalized chirp-like (GCL) sequence, a pseudo random sequence or Reed-Muller codes.

28. The method of claim 22 further comprising:
forming a seventh preamble sequence by replacing non-zero tones at predetermined positions in the third or fourth preamble sequences with zero tones.

29. The method of claim 28, wherein every R non-zero tones are replaced with zero tones, which results in another time-domain characteristic K'=K×R, K' and R being positive integers.

30. The method of claim 22, wherein the first preamble sequence is one for communication in a legacy standard, and the third and fourth preamble sequences are ones for communication in a new standard backward compatible with the legacy standard.

31. The method of claim 30, wherein a terminal camps on a portion of bands available for the wireless communication system.

32. A method of forming a preamble sequence in a wireless communication system, the method comprising:
determining a value K>1 related to a time-domain characteristic of the wireless communication system, the time-domain characteristic being that a time-domain preamble sequence includes a number of K waveforms similar in shape to one another having a linear phase shift;
identifying a first preamble sequence for a first frequency band, the first preamble sequence in a frequency domain having a plurality of tones defining a first length that is an integer multiple of K, the first preamble sequence maintaining the time-domain characteristic;
identifying at least one second preamble sequence each for a second, different frequency band and being a duplicate of the first preamble sequence, the at least one second preamble sequence in the frequency domain having at least one plurality of tones;
forming a third preamble sequence by concatenating the first preamble sequence and the at least one second preamble sequence in the frequency domain; and
forming a fourth preamble sequence by multiplying the at least one second preamble sequence by a linear phase, wherein a phase value of the linear phase is related to the position of a non-zero tone of the at least one second preamble sequence in the third preamble sequence.

33. The method of claim 32, wherein the at least one second preamble sequence is multiplied by a linear phase $$e^{\frac{j2\pi r}{N}},$$

where N is the length of the first new preamble sequence and r is the ordinal number of a non-zero tone of the at least one second preamble sequence in the third preamble sequence.

* * * * *